United States Patent [19]

Chevroulet et al.

[11] Patent Number: 5,486,019
[45] Date of Patent: Jan. 23, 1996

[54] AUTOMOTIVE VEHICLE INCLUDING A SECURITY ARRANGEMENT PROVIDED WITH AN INFLATABLE PROTECTIVE BAG

[75] Inventors: Tristan Chevroulet, Neuchatel; Claude Beroud, Court, both of Switzerland

[73] Assignee: SMH Management Services AG, Biel, Switzerland

[21] Appl. No.: 206,908

[22] Filed: Mar. 7, 1994

Related U.S. Application Data

[63] Continuation of Ser. No. 934,721, Aug. 24, 1992, abandoned.

[30] Foreign Application Priority Data

Aug. 23, 1991 [CH] Switzerland ............... 91/10622

[51] Int. Cl.$^6$ .................................................. B60R 21/22
[52] U.S. Cl. .................. 280/730.1; 280/732; 280/743.1; 180/271
[58] Field of Search .................. 280/728 R, 730 R, 280/731, 732, 743 R, 728.1, 730.1, 743.1; 180/271, 274, 323, 332, 333, 78

[56] References Cited

U.S. PATENT DOCUMENTS

| 3,582,107 | 6/1971 | Goetz et al. | 280/730.1 |
| 3,694,003 | 9/1972 | Radke | 280/735 |
| 3,738,681 | 6/1973 | Wada et al. | 280/728.1 |
| 3,801,126 | 4/1974 | Knight et al. | 280/732 |
| 4,478,308 | 10/1984 | Klaassen | 180/333 |
| 4,726,442 | 2/1988 | Hansen | 180/332 |
| 5,160,164 | 11/1992 | Fischer et al. | 280/732 |
| 5,172,790 | 12/1992 | Ishikawa et al. | 280/730 |

FOREIGN PATENT DOCUMENTS

| 2030863 | 12/1971 | Germany . |
| 2044114 | 3/1972 | Germany . |
| 2150744 | 5/1973 | Germany . |
| 0110252 | 4/1992 | Japan | 280/730 |

Primary Examiner—Karin L. Tyson
Assistant Examiner—Paul N. Dickson
Attorney, Agent, or Firm—Weil, Gotshal & Manges

[57] ABSTRACT

The invention concerns an automotive vehicle. This vehicle comprises a dashboard (26), steering control handles (28) distanced from the dashboard (26), the dashboard comprising a compartment (32) closed by a flap (34) and in which is arranged a protective bag (36) of supple material at least partially gas-tight, the vehicle further includes a gas source (38), the bag (36) being coupled to the gas source (38) and one or more accelerometers for automatically releasing the gas source (38) in response to abnormal behaviour of the vehicle, in that the bag (36) may assume a folded first state in which it is entirely housed within the compartment (32) and an inflated second state in which it extends out of the compartment (32) and in that the bag comprises a central portion (46) which is arranged so as to spread out, in the inflated state, over substantially the entire area of the dashboard (26).

9 Claims, 6 Drawing Sheets

AUTOMOTIVE VEHICLE INCLUDING A SECURITY ARRANGEMENT PROVIDED WITH AN INFLATABLE PROTECTIVE BAG

This is a continuation of application Ser. No. 07/934,721 filed on Aug. 24, 1992 now abandoned.

This invention concerns an automotive vehicle including a security arrangement provided with a protective bag inflatable by a gas source, the protective bag being intended to be interposed between the vehicle occupants and the resistant portions of the vehicle located proximate the occupants in case of abnormal behaviour of the vehicle, as in the case of a shock.

BACKGROUND OF THE INVENTION

In all vehicles presently manufactured and sold, such as cars, trucks or like vehicles, the control means manually actuable by the driver in order to direct his vehicle comprise a steering wheel mounted on a steering column which is mechanically coupled to the guiding wheels. In case of an accident, for example in case of a collision with a fixed obstacle or another vehicle, the driver of the vehicle may be seriously injured, even killed in being violently thrown against the steering wheel or, should the latter deform or break, against the end of the steering column which may furthermore itself be forced into the occupant space of the car towards the driver.

Likewise, a passenger having occupied a place beside the driver may be seriously injured or even killed in being violently thrown against the dashboard and/or the windshield of the vehicle.

One of the most effective measures which have been proposed and put into practice to suppress or at least attenuate this danger consists in equipping the vehicle with a safety arrangement comprising inflatable protective bags which are normally empty and folded in suitable housings and which are rapidly inflated in case of collision, such bags being arranged and dimensioned in a manner such that when they are inflated, they dampen the impact of the driver and his passenger respectively against the steering wheel and against the dashboard or windshield.

The housing intended to contain the conductor's protective bag in normal conditions, that is to say when the bag is empty and folded, is generally in the hub of the steering wheel while the protective bag for the passenger or passengers is arranged in a dashboard compartment.

There results on the one hand that such hub must have relatively substantial dimensions which may interfere with the visibility of the instruments on the dashboard and, on the other hand, that such bag cannot assume large dimensions when it is inflated, which limits its effectiveness in the case of an accident.

There likewise results that the protective bag of the driver and the protective bag of the passenger must be distinct from one another, which increases the cost of the overall safety arrangement. Such safety arrangements are described for example in patent document DE 2 123 325.

Patent document FR 2 227 979 proposes another safety arrangement of this nature. In this document, the safety arrangement comprises two systems of protective bags, respectively inflatable for the driver and for the passenger or passengers. Such bag systems are located in a folded state in a compartment located in the neighbourhood of the ceiling of the vehicle occupant space. Each bag system comprises a bag section for retaining the trunk and a bag section forming a lateral curtain, such two sections being secured to the ceiling. Each of such sections is connected to a gas source, separated from the bags by inflatable tubes. The bag section for retaining the trunk is intended to be interposed between the occupants in the front of the vehicle and the steering wheel or dashboard, and the bag section forming a lateral curtain is intended to be interposed between an occupant and a lateral wall of the vehicle. Such an arrangement nevertheless still presents numerous drawbacks.

The first disadvantage resides in the fact that the bag systems for the driver and the passenger or passengers are independent, which brings about a substantial volume and weight to be housed in the compartment and necessitates separate gas sources. The cost of such an arrangement is thus elevated. This furthermore constitutes a non-negligible encumberment at the vehicle ceiling which, in order not to hamper the vehicle occupants, necessitates an increase in the height of the vehicle.

Additionally, the fact that the bags are positioned and inflated from the ceiling of the occupant space requires the occupants to be correctly settled into the bottom of their seat in order that the bags be effective at the moment of inflation. Effectively, if one of the occupants is slightly forwardly inclined or is not completely settled into the bottom of his seat at the instant when the accident occurs and when the bags are inflated, these latter, coupled with the deceleration accompanying the accident, are going in the first place to throw the head of said occupant towards the steering wheel or the dashboard. One easily understands thus that in this configuration the arrangement is not only ineffective, but also dangerous.

Another difficulty consists in that the gas source is widely separated from the different sections of the bag and that it is coupled to such latter through conduits in the form of tubes of relatively small cross-sections so that the distance to be travelled by the gas is increased and the speed of inflation diminished. Furthermore, without specific dimensioning of the cross-section of the tubes, the gas speed is limited to the speed of sound.

The invention thus has as main purpose to overcome these drawbacks of the above-mentioned prior art in furnishing an automotive vehicle provided with a safety arrangement having inflatable protective bags, the effectiveness of which is improved and the cost considerably diminished.

SUMMARY OF THE INVENTION

To this end, the invention has as its objective an automotive vehicle characterized in that it comprises a dashboard, steering control means for the vehicle distanced from the dashboard, the dashboard comprising a compartment closed by at least one flap and in which is arranged a protective bag formed of supple material at least partially gas tight, the vehicle further comprising a gas source, means for coupling the bag to the gas source and means for automatically releasing the gas source in response to abnormal behaviour of the vehicle, said bag assuming a folded non-operating first state in which it is entirely housed within the compartment prior to automatic release of the gas source, and an inflated operating second state in which it extends out of the compartment after automatic release of the gas source, such bag comprising a central portion which in the operating state is arranged so as to spread out over substantially the entire area of the dashboard from the driver's door to the passenger's door, the central portion being intended in such state to be interposed between the vehicle occupants and the dashboard in case of abnormal behaviour of the vehicle.

Thus, there is obtained a vehicle provided with a safety arrangement comprising a protective bag in a single piece which enables obtaining effective protection at the same time for the driver and the passenger or passengers in the front of the vehicle while exhibiting a weight and volume which are considerably diminished.

According to an advantageous characteristic of the invention, the bag further comprises at least two rearward projections which, in the operating state, extend respectively along a lateral wall of the vehicle, such rearward projection being intended in such state to be interposed between the occupants and the lateral walls of the vehicle in case of abnormal behaviour.

Thus, there is obtained a vehicle provided with a safety arrangement comprising a protective bag in one piece which enables obtaining effective protection of the occupants if thrown against the dashboard and/or against the lateral walls of the vehicle, as well as against lateral ejection of the occupants.

According to an advantageous variant of the invention, the bag comprises at least one additional rearward projection arranged in the central portion thereof, such projection being arranged to extend in the inflated state between the vehicle occupants.

Thanks to such additional projection or projections, the occupants of the vehicle are isolated from one another so that they are correctly maintained in place in their seat during shocks and are consequently protected against injuries resulting from eventual shocks between them and/or violent displacements of their bodies.

According to an advantageous characteristic of the invention, the body of the vehicle comprises a panel arranged so as to permit communication of the occupant space with the exterior when the interior pressure in the occupant space exceeds a predetermined threshold.

Thanks to these characteristics, body injuries which could be brought about by the over-pressure created within the vehicle during the inflation of the bag are avoided.

Other characteristics and advantages of the invention will appear upon reading the following description of an embodiment thereof given by way of a non-limiting illustrative example in connection with the attached drawings.

DESCRIPTION OF THE PREFERRED EMBODIMENT

In referring initially to FIGS. 1 to 6, there will be seen an automotive vehicle according to the invention designated by the general reference 1. This vehicle shows in a standard manner a body 2 comprising basically a motor compartment 4 and an accommodation space 6 for the occupants. The space 6 is defined by a roof 8, a windshield 10, a rear window 12, lateral windows (not shown) provided in the lateral walls 13 forming doors, a floor 14, a front bulkhead 16 which separates the motor compartment 4 from space 6 and a rear bulkhead 18.

As is clearly apparent from the figures, it is seen that the occupant space 6 comprises two seats 20, each equipped with a base 22 and a back rest 24 and in which the occupants are installed, here represented in broken outline on the drawings.

Additionally, occupant space 6 comprises a dash board 26 which extends substantially over the entire width of the vehicle proximate the upper portion of front bulkhead 16.

Occupant space 6 also comprises steering control means 28 for the vehicle separated from the dashboard 26 or, in other words, control means which are not arranged in the free space between the driver and the dashboard. Such control means 28 comprise in the example as shown two steering handles, each incorporated in an armrest 30 of seat 20 so that the space located between dashboard 26 and the vehicle driver is free.

According to the invention, the dashboard 26 comprises a compartment 32 closed by a flap 34 hinged on the dashboard and which can pivot towards the windshield upon opening thereof. A protective bag 36 for the driver and for the passenger or passengers is housed in compartment 32. A gas source 38 and means 40 for coupling bag 36 to source 38 are provided at the exterior of compartment 32. More specifically, the wall of the bottom 42 of the compartment together with means 40 serve to secure gas source 38 within the vehicle. It will be noted in the example shown that the protective bag is coupled to a plurality of gas sources 38, in this case four.

According to a variant, the protective bag could be coupled to a single gas source correctly dimensioned and arranged substantially in the middle zone of the bag.

The protective bag 36 is formed of a supple material which is at least partially gas tight, for example, from a polyamide tissue. By a material at least partially gas tight, there will be understood a material which retains the gas during a time sufficient to permit inflation of the bag.

The gas source 38 is a standard pyrotechnical system in which the gas is generated for instance by combustion of a propergol based on sodium nitride.

The vehicle further comprises automatic releasing means 44 for the gas source or sources 38. Such releasing means 44 are coupled to the gas sources 38 by connections schematically shown by wires 45 on the drawings. Such automatic releasing means 44 generally comprise one or several accelerometers which are installed, in the example as shown, in the motor compartment and which are arranged to release the gas sources 38 by an appropriate electronic circuit (not shown) during abnormal behaviour of the vehicle. By abnormal behaviour there is understood excessive acceleration, deceleration, compression and/or twisting of the vehicle.

Figure 4:
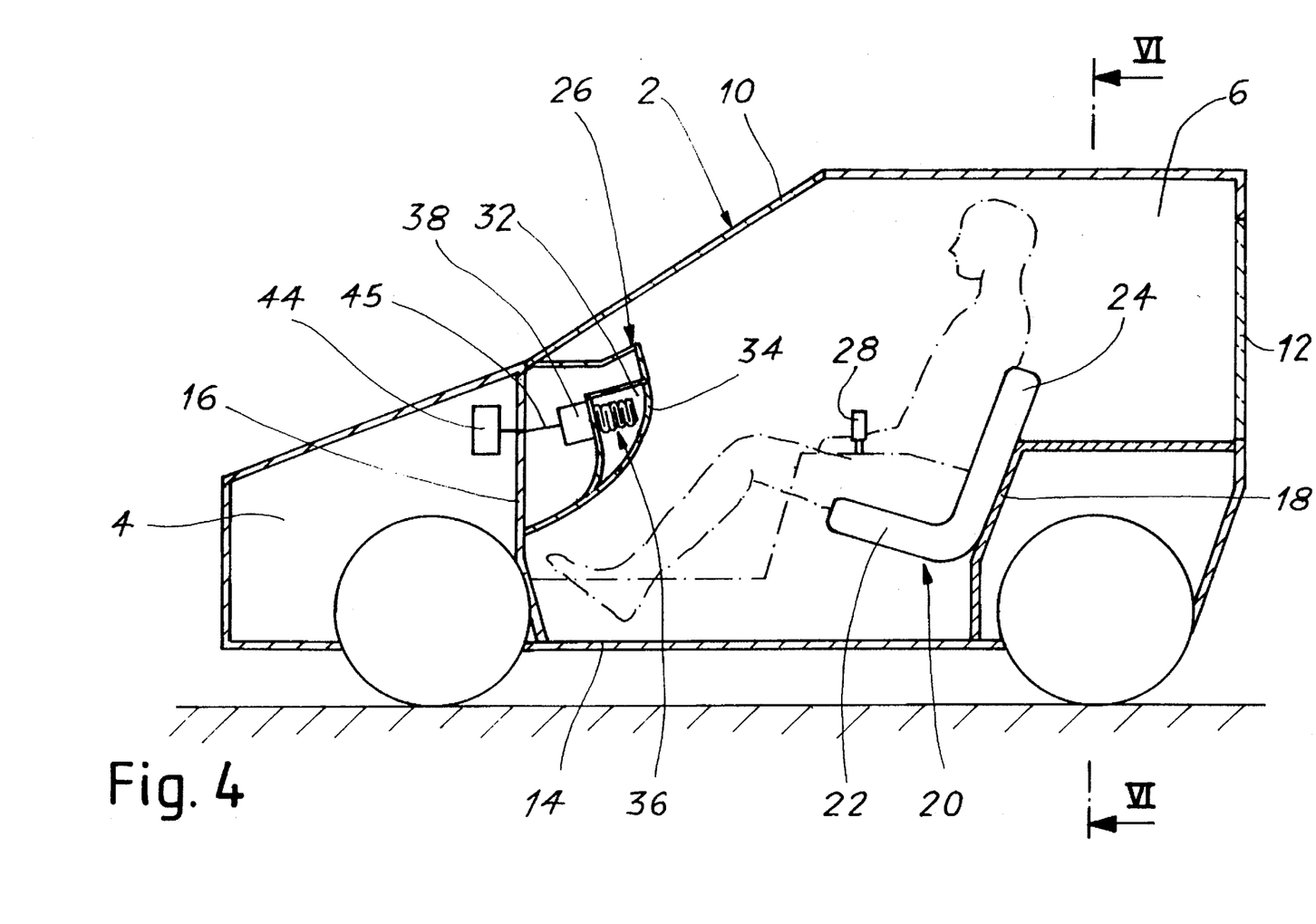
FIGS. 4 and 5 are figures similar to FIGS. 1 and 2 in which the protective bag is in the folded state.
Figure 5:
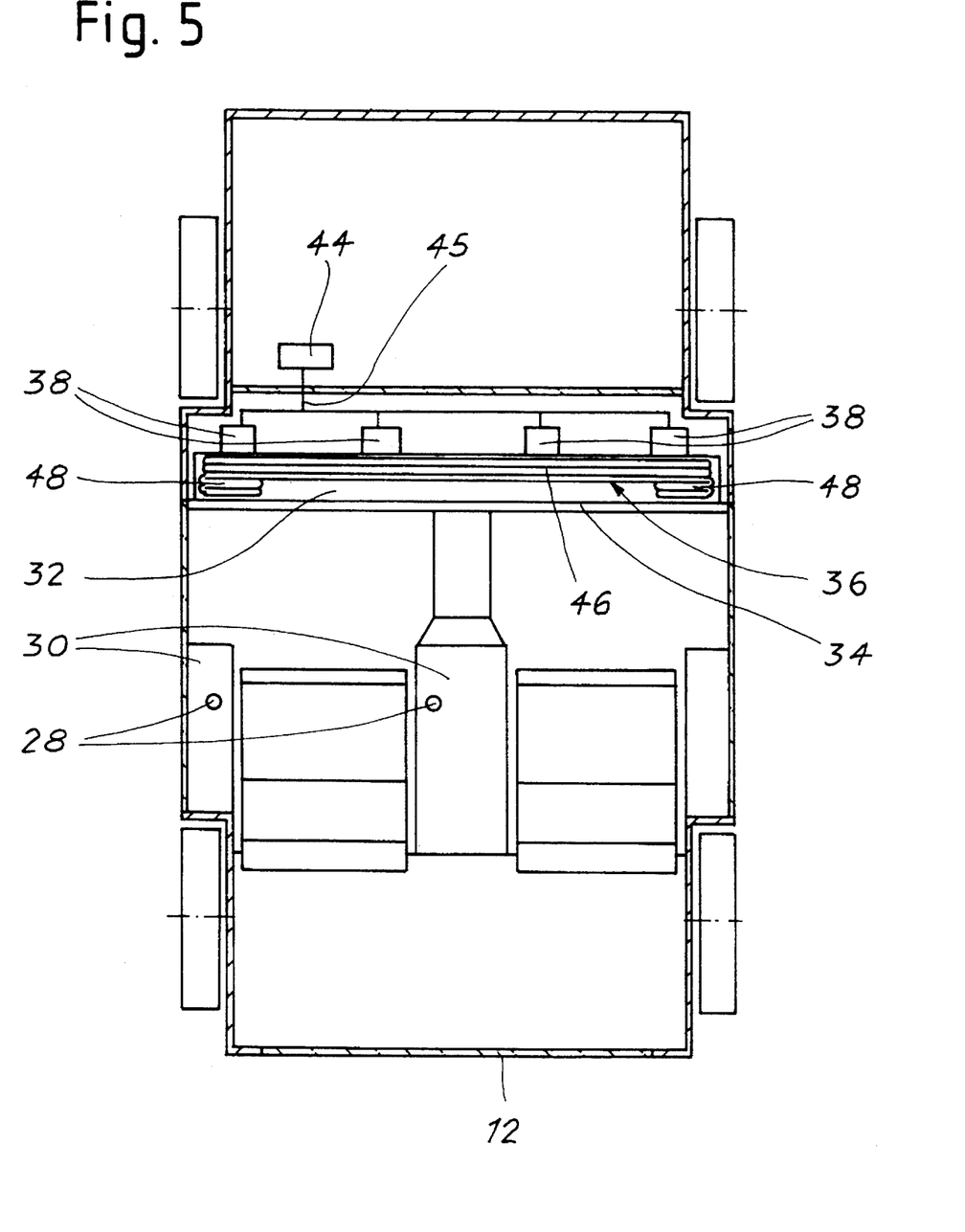
Figure 6:
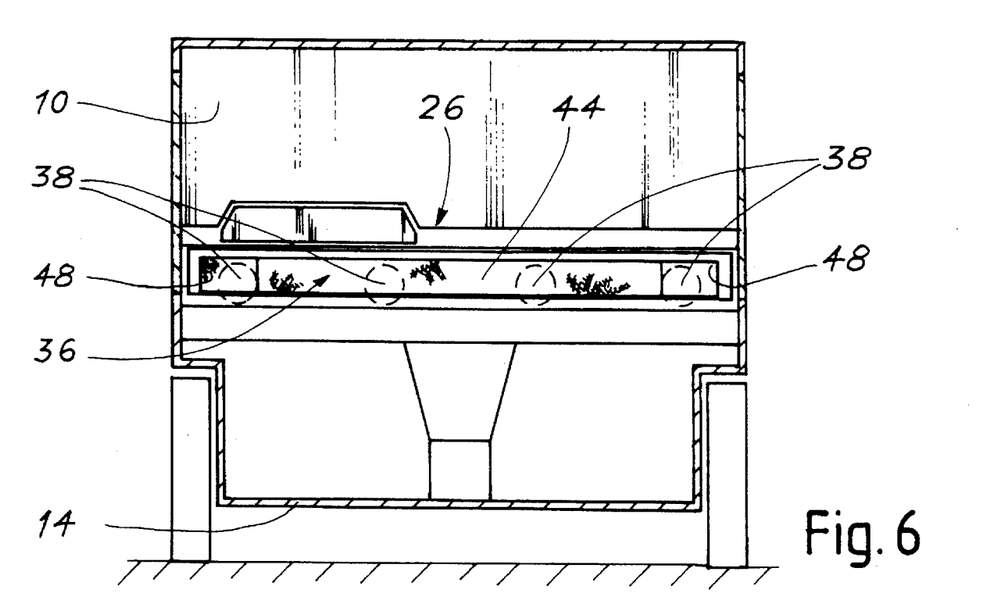
FIG. 6 is a cross-section along line VI—VI of FIG. 4.

The protective bag 36 may assume a first non-operating folded state visible on FIGS. 4 to 6, in which it is entirely housed within compartment 32. In this case flap 34 is closed.

Such first state represents the state of the protective bag under normal conditions, that is to say, before releasing means 44 have detected behaviour of the vehicle considered as abnormal and have released the gas sources.

Figure 1:
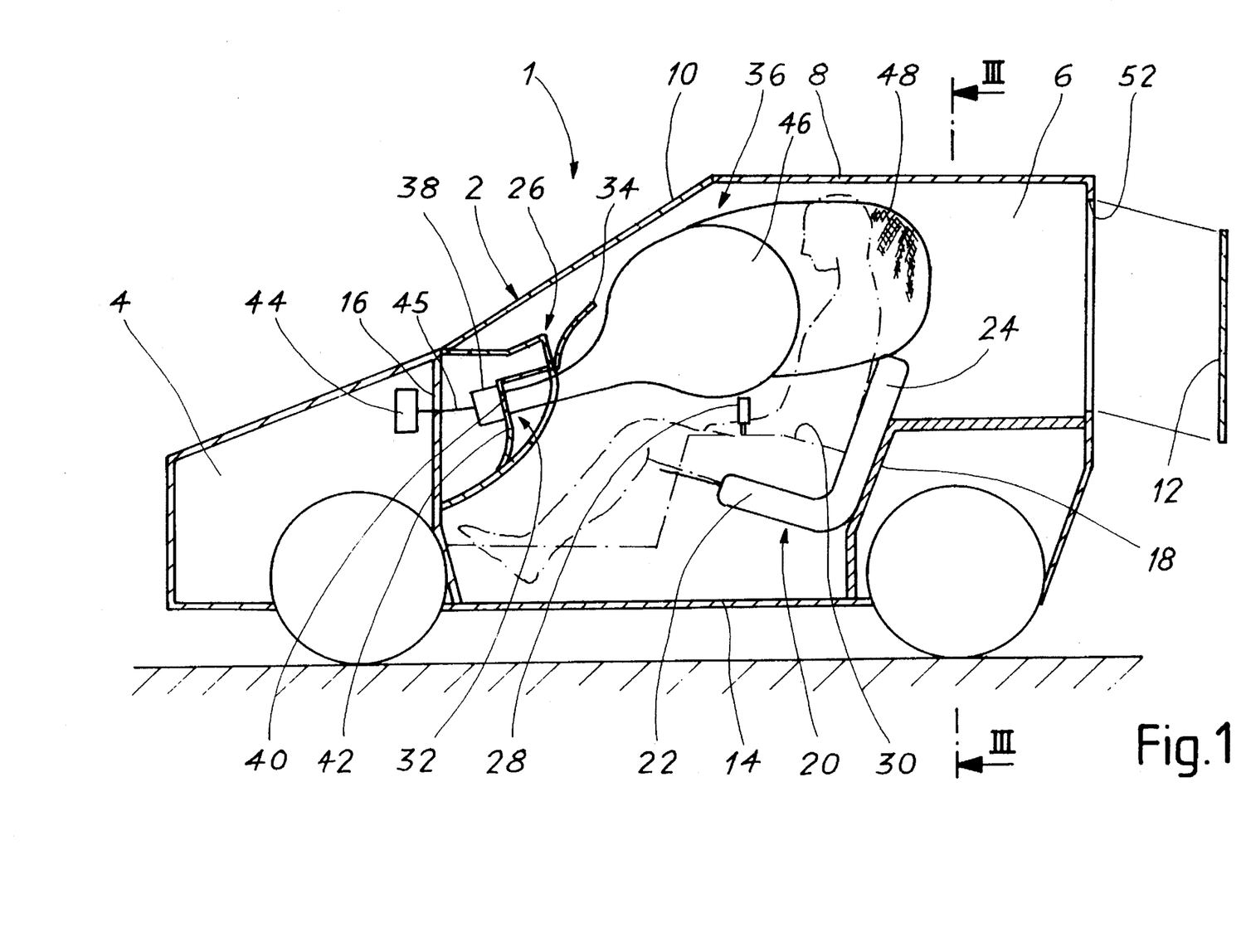
FIG. 1 shows schematically a side elevation of the contours of an automotive vehicle in which the central portion and the rearward projections of the protective bags are in the inflated state and shows the position of the occupant relative to the bag.
Figure 2:
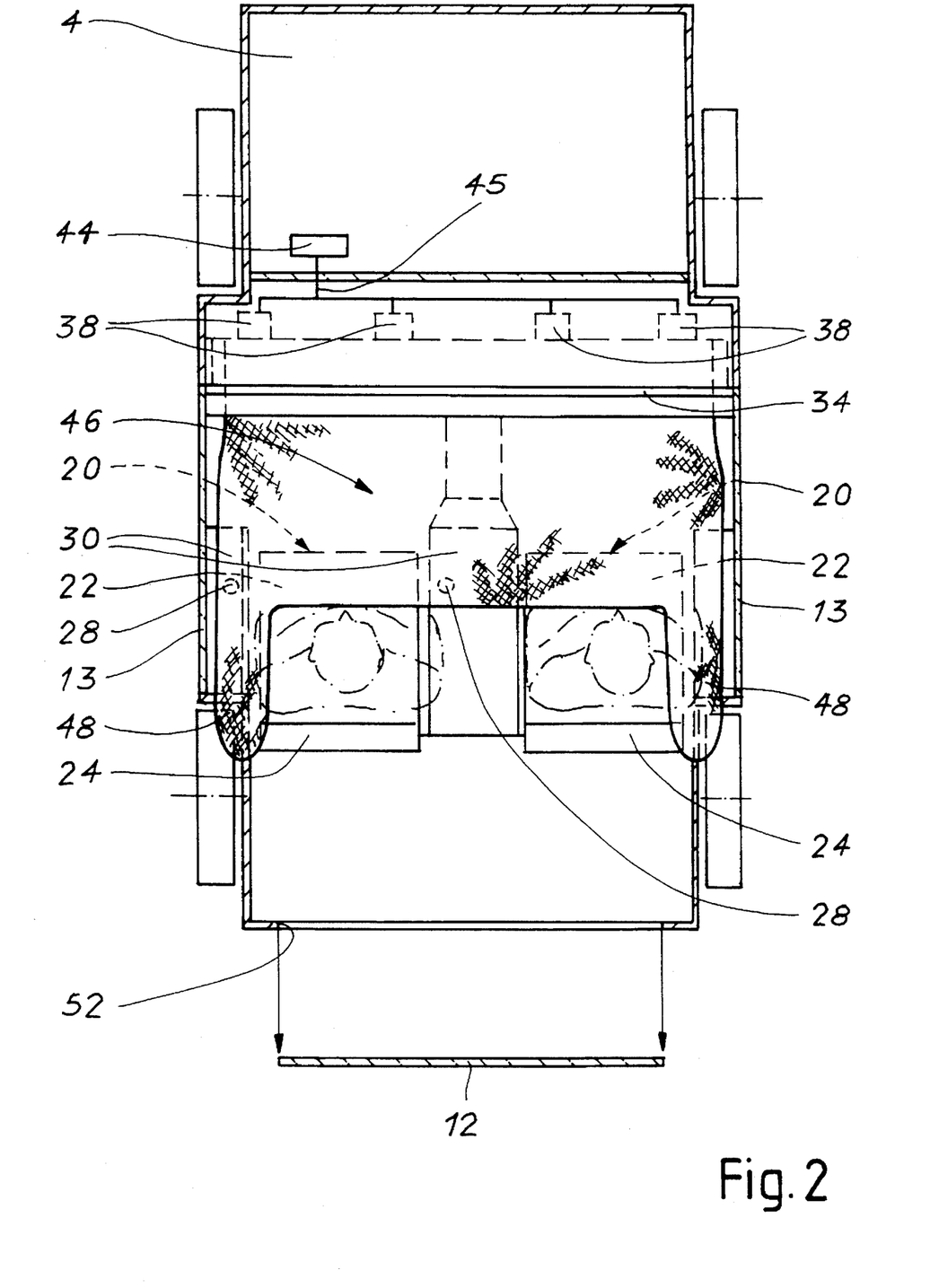
FIG. 2 is a top view of an automotive vehicle according to FIG. 1, the upper portion of the body of the vehicle having been omitted.
Figure 3:
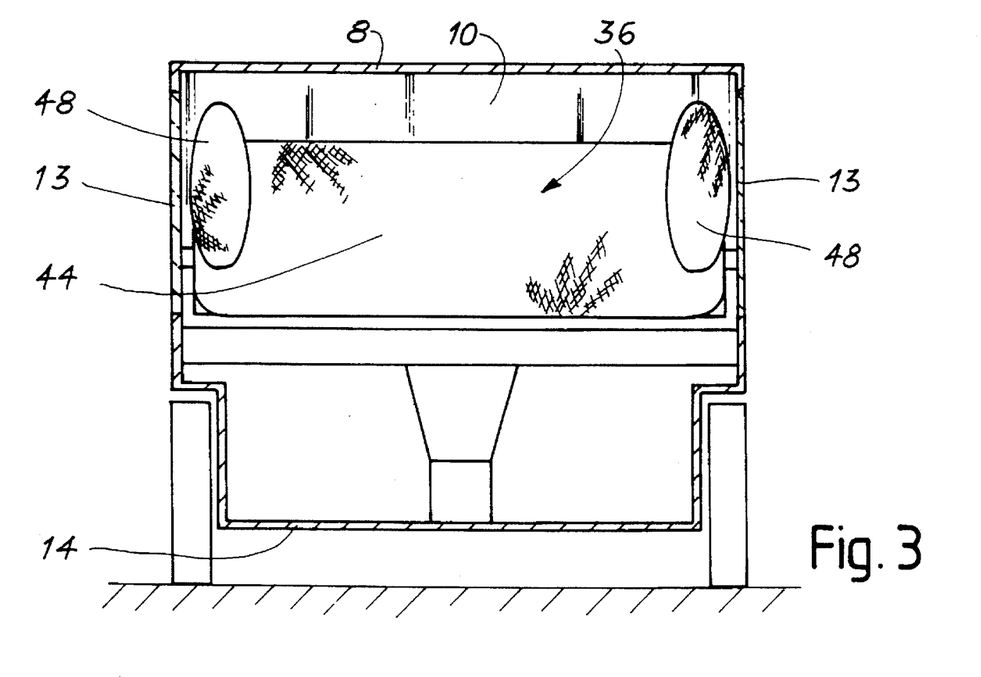
FIG. 3 is a cross-section along line III—III of FIG. 1.

As is visible particularly on FIGS. 1 to 3, the protective bag 36 may assume an inflated operating second state in which it extends out of compartment 32 and occupies a substantial portion of the space separating the driver and the passenger or passengers from the dashboard 26. This second state represents the state of the protective bag after abnormal behaviour of the vehicle has been detected and releasing means 44 have triggered the gas source or sources 38.

Incidentally, it will be noted that the fact of having provided steering control means of the vehicle distanced from the dashboard frees up the space normally occupied by the steering wheel and permits providing a single protective bag 36 in order to protect at the same time the driver and the passenger or passengers.

Furthermore, the fact of having provided a single protective bag facilitates the manufacture and diminishes considerably its cost since the manufacturing cost of such a single bag is less than the sum of the manufacturing costs of two distinct bags.

As is particularly evident from FIGS. 2 and 3, it is seen that the protective bag 36, in accordance with the invention, comprises a central portion 46 which is arranged to extend in the operating state over substantially the entire area of the dashboard 26 or, in other words, over the entire width of the latter. The protective bag 36 further comprises two rearward projections 48 each of which extends in the operating state from each end of the central portion 46 towards the passengers along the lateral walls 13 of the vehicle. Such projections 48 each form a lateral curtain and are arranged in order to protect the occupants from an eventual rebound against such walls 13 in case of an accident.

Preferably, the central portion 46 and the projections 48 have dimensions and are arranged so as to extend in the inflated state respectively at the level of the trunk and at the level of the head of the vehicle occupants.

The central portion 46 has the general form of a tube exhibiting a cross-section in the form of drop (FIG. 1) the narrowed-down portion of which is coupled to the gas sources while the rearward projections 48 have the form of a substantially rectangular cushion having an elongated oval cross-section (FIG. 3).

In referring to FIGS. 4 to 6, it will be seen that the protective bag 36 as well as compartment 32 extend substantially over the entire width of the dashboard 26. Such an arrangement of the bag in the compartment enables folding it in an accordeon form so that it exhibits a relatively limited volume and that the flow of gas into bag 36 is facilitated whereby it may extend and inflate rapidly when the gas sources are released.

As is well understood, the protective bag may omit the rearward projections 48 in a variant not shown.

The vehicle according to the invention further comprises a panel formed by the rear window 12 which is arranged to permit communication of the occupant space 6 with the exterior when the pressure therein exceeds a predetermined threshold. Effectively, when the protective bag 36 inflates into the operating state, it generates a rapid increase of pressure within the occupant space which is a function of the relationship between the volume of the space and the volume of the protective bag. This increase can be dangerous for the vehicle occupants and bring about, for example, injuries to the hearing system such as rupture of the eardrums.

Figure 7:
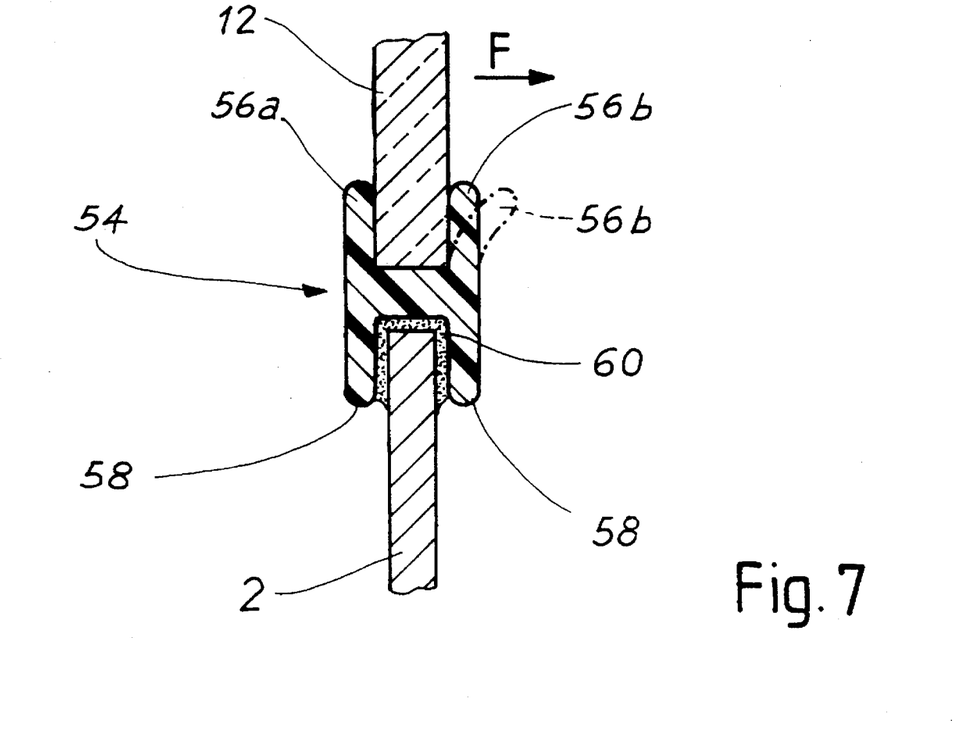
FIG. 7 is an enlarged detail of a method for securing the panel onto the body of the automotive vehicle according to the invention.

Referring more specifically to FIG. 7, there will be seen that the rear window 12 is sealed in a standard manner within an opening 52 formed in the body of the vehicle, by means of a packing 54 formed for example from an elastomer which follows the contours thereof. This packing 54 has a cross-section in the form of an H and comprises a first pair of lips 56*a*, 56*b* which clamp the window 12 and a second pair of lips 58 which clamp the body of the vehicle.

Packing 54 exhibits a peripheral portion which may yield in order to liberate panel 12 in case of over-pressure within the occupant space. Such peripheral portion is formed by lip 56*b* which is on the exterior and which flexes in the sense of arrow F in order to be outwardly moved as is shown in broken outline upon appearance of excessive pressure within the occupant space.

It will be noted in this respect that the second pair of lips 58 is secured by means of a glue 60 in addition to the securing thereof by clamping so that the major portion of the effort provoked by the excess pressure is applied to exterior lip 56*b* of the first pair.

In accordance with a variant, the pair of lips which is secured by gluing may be the pair of lips 56 which clamps panel 12 and it is self-evident that in this case the peripheral portion of the packing which yields upon excess pressure is formed by lip 58 which is on the exterior.

Figure 8:
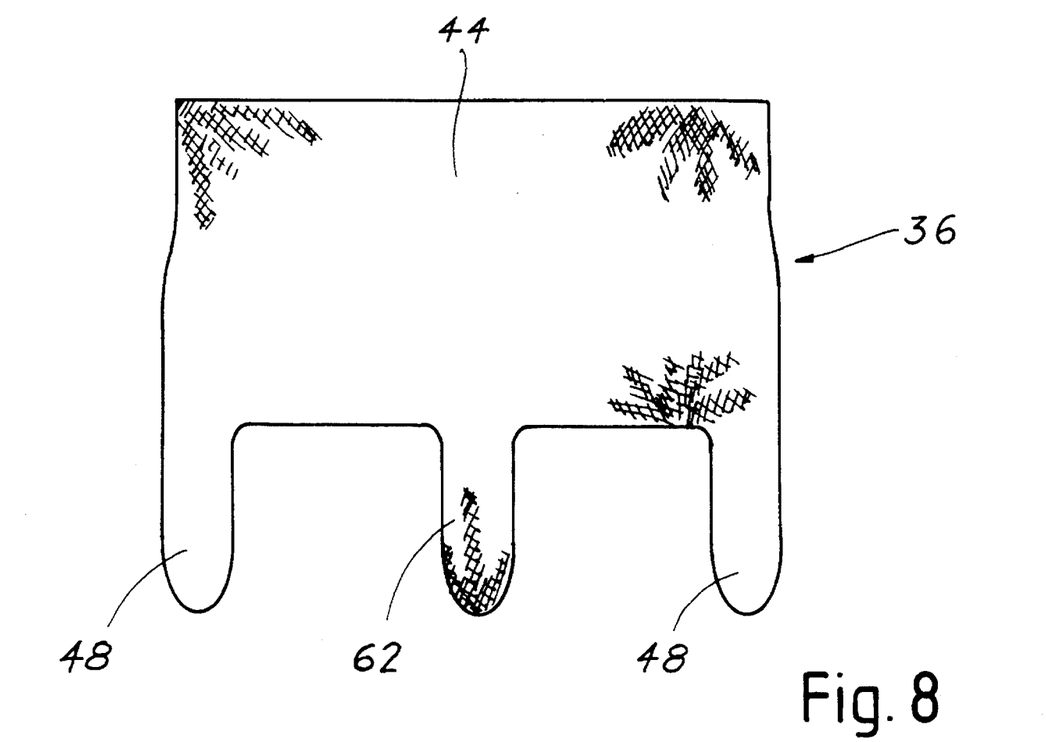
FIG. 8 is an elevational view of a variant of a protective bag equipping the automotive vehicle according to the invention.

Referring now to FIG. 8, there has been shown a variant of the embodiment of a protective bag according to the invention, in which there has been provided an additional rearward projection 62 arranged in the central portion 46 of bag 36. Such projection 62 is arranged substantially in the intermediate portion of the central portion 46 in order to extend in the operating state between the driver and the vehicle passenger and thus protect them from a shock occurring between the two, in particular during a lateral shock of the vehicle against an obstacle.

The protective bag described on FIG. 8 is provided for installation in a vehicle comprising two occupants in the front of the vehicle, but it will also be understood that one could provide more than one additional projection if the number of occupants increases, such projections being on each occasion arranged so as to extend between each occupant.

Operation of the safety arrangement formed by the protective bag is as follows:

When the vehicle circulates normally, the protective bag 36 is contained in compartment 32. At the instant when the automatic releasing means 44 detect an abnormal behaviour of the vehicle, they release the gas sources 38 so that the protective bag 36 receives the combustion gases (filtered and cooled), dilates and exerts pressure which has the effect of pushing the flap towards the windshield and liberating the bag in order that it inflate until it reaches its operating state (FIGS. 1 to 3). At the same time, the excess pressure created in occupant space 6 acts on the rear window 12 so that lip 56*b* of its securing packing yields and liberates the window, thus placing the space 6 in communication with the exterior. The overpressure brought about by the inflation of the protective bag has consequently no undesirable effect on the occupants in contrast to the arrangements of the prior art.

To give an idea of the operations, the sequence of these events brought about some tens of milliseconds.

What we claim is:

1. An automotive vehicle comprising a dashboard, side-by-side driver's and passenger's seats, steering control means for the vehicle including a steering handle positioned in close proximity to the driver's seat, the space between said dashboard and a driver being free, the dashboard having a top portion facing the windshield and a front portion facing the driver's and passenger's seats and comprising a compartment and a flap for closing said compartment, said flap being positioned in said front portion, a protective bag formed of supple material in said compartment, said bag being at least partially gas tight, the vehicle further comprising a gas source, means for coupling the bag to the gas source and means for automatically releasing the gas source in response to abnormal behavior of the vehicle, said bag having a folded non-operating first state in which it is entirely housed within the compartment prior to automatic release of the gas source, and an inflated operating second state in which it extends out of the compartment after automatic release of the gas source, said bag comprising a central portion which in the operating state is arranged so as to spread out over substantially the entire area of the dashboard, the central portion in such state being interposed between occupants of both driver's and passenger's seats and the dashboard.

2. An automotive vehicle as set forth in claim 1 wherein the bag further comprise two rearward projections which in the operating state extend respectively along the opposing lateral walls of the vehicle, such projections in such state being interposed between the occupants and the lateral walls of the vehicle in case of abnormal behaviour of the vehicle.

3. An automotive vehicle as set forth in claim 2 wherein the bag comprises an additional rearward projection arranged in the central portion, such projection extending in the inflated state between the occupants of the driver's and passenger's seats.

4. An automotive vehicle as set forth in claim 1 further comprising a vehicle body defining an occupant accommodation space wherein the vehicle body comprises a panel arranged to permit communication of the accommodation space with the exterior when the pressure in the accommodation space exceeds a predetermined threshold.

5. An automotive vehicle as set forth in claim 4 further including a packing for sealing the panel into an opening formed in the vehicle body, said packing following the contour of said panel and, including a peripheral portion adapted to yield to permit such communication when the interior pressure of the accommodation space exceeds a predetermined threshold for releasing the panel.

6. An automotive vehicle as set forth in claim 4 comprising a rear window, the panel being constituted by the vehicle rear window.

7. An automotive vehicle as set forth in claim 2 wherein the central portion and rearward projections of the bag in the inflated state are arranged to extend respectively at the trunk and head levels of the vehicle occupants.

8. An automotive vehicle as set forth in claim 1 wherein the compartment as well as the bag in the folded first state extend substantial over the entire length of the dashboard.

9. An automotive vehicle as set forth in claim 1 further including at least one additional gas source.

* * * * *